United States Patent [19]

Lee

[11] Patent Number: 5,990,956
[45] Date of Patent: Nov. 23, 1999

[54] METHOD AND APPARATUS FOR PADDING A VIDEO SIGNAL FOR SHAPE ADAPTIVE TRANSFORMATION

[75] Inventor: Sang-Hoon Lee, Seoul, Rep. of Korea

[73] Assignee: Daewoo Electronics, Inc., Seoul, Rep. of Korea

[21] Appl. No.: 08/775,039

[22] Filed: Dec. 30, 1996

[51] Int. Cl.$^6$ .................................................. H04N 7/12
[52] U.S. Cl. .......................... 348/404; 348/408; 348/410; 382/250
[58] Field of Search .................................... 348/404, 405, 348/408, 409, 410, 699, 392; 382/176, 180, 250, 275, 6; 358/280, 455; 395/130; 364/413.13; H04N 7/12

[56] References Cited

U.S. PATENT DOCUMENTS

| | | | |
|---|---|---|---|
| 4,577,235 | 3/1986 | Kannapell et al. | 358/280 |
| 5,014,198 | 5/1991 | Umemura | 364/413.13 |
| 5,268,967 | 12/1993 | Jang et al. | 382/6 |
| 5,280,367 | 1/1994 | Zuniga | 358/462 |
| 5,374,958 | 12/1994 | Yanagihara | 348/405 |
| 5,440,344 | 8/1995 | Asamura et al. | 348/405 |
| 5,552,829 | 9/1996 | Kim et al. | 384/392 |
| 5,583,659 | 12/1996 | Lee et al. | 358/455 |
| 5,589,993 | 12/1996 | Naimpally | 386/81 |
| 5,761,401 | 6/1998 | Kobayashi et al. | 395/130 |
| 5,767,911 | 6/1998 | Boon | 348/409 |

Primary Examiner—Bryan Tung
Assistant Examiner—Tung T. Vo
Attorney, Agent, or Firm—Pennie & Edmonds LLP

[57] ABSTRACT

A method for padding an input video signal having a multiplicity of image blocks for shape adaptive discrete cosine transform first scans an image block containing object and background pixels to thereby detect a padding pixel located between object pixels on a same row or column in the image block and calculates a substitute pixel value based on pixel values of the object pixels in the image block. Once the substitute pixel value is determined, the padding pixel is compensated by the substitute pixel value to thereby provide a padded image block. The padded image block having an object region containing the object pixels and the padding pixel compensated by the substitute pixel value is transformed to a set of SA-DCT coefficients through the use of the shape adaptive discrete cosine transform.

17 Claims, 3 Drawing Sheets

METHOD AND APPARATUS FOR PADDING A VIDEO SIGNAL FOR SHAPE ADAPTIVE TRANSFORMATION

FIELD OF THE INVENTION

The present invention relates to a video signal encoding method and apparatus; and, more particularly, to a method and apparatus for padding a video signal for use in a video encoder employing shape adaptive discrete cosine transform (SA-DCT) technique.

DESCRIPTION OF THE PRIOR ART

In various electronic applications such as high definition TV and video telephone systems, a video signal may be transmitted in a digital form. When the video signal comprising a sequence of video "frames" is expressed in a digital form, there occurs a substantial amount of digital data: for each line of a video frame is defined by a sequence of digital data elements referred to as "pixels". Since, however, the available frequency bandwidth of a conventional transmission channel is limited, in order to transmit the substantial amount of digital data through the fixed channel, a video signal encoding method is normally used to compress the digital data.

One of such methods for encoding video signals for a low bit-rate encoding system is the so-called object-oriented analysis-synthesis coding technique (see Michael Hötter, "Object-Oriented Analysis-Synthesis Coding Based on Moving Two-Dimensional Objects", Signal Processing: Image Communication, 2, 409–428(1990)).

According to the object-oriented analysis-synthesis coding technique, an input video signal, which has moving objects, is divided according to the objects. In processing image data or pixels lying within an object, a transform coding technique for reducing the spatial redundancies contained in the image data may be employed in the object-oriented analysis-synthesis coding technique. One of the most frequently used transform coding techniques for image data compression is a DCT based block transformation coding, which converts a block of digital image data, for example, a block of 8×8 pixels, into a set of transform coefficients. Since the block-based DCT cannot be directly applied to the object-oriented coding technique, methods for coding pixels in arbitrary shaped image objects have been proposed. An SA-DCT algorithm is one of such methods which provide means for generic coding of a segmented video signal having arbitrary shaped objects over a wide range of bit rates, to thereby render it possible to encode arbitrary shaped objects within N×N image blocks, N being a positive integer.

The input video signal is separated into adjacent blocks of N×N pixels, and only full blocks contained within an object or segmented region can be encoded using a standard N×N DCT. Blocks containing a boundary of segmented regions are encoded separately using the SA-DCT.

The SA-DCT method utilizes predetermined orthogonal sets of DCT based functions. FIG. 1A shows an example of an image block segmented into two regions, object and background regions. The object and background regions contain object pixels and background pixels, respectively. To perform vertical SA-DCT of the object region, the length of each column j ($0 \leq j \leq 9$) of the object region is determined and the object pixels on the columns of the object region are shifted to the upper border of the 8×8 block aligned as shown in FIG. 1B. Depending on the length M of each column, a DCT matrix $D_m(p,k)$ containing a set of M DCT based vectors is selected, wherein $D_m(p,k)$ for each column is represented as:

$$D_M(p, k) = c_o \cdot \cos\left[p\left(k + \frac{1}{2}\right) \cdot \frac{\pi}{M}\right] \quad \text{EQ. 1}$$

with k and p ranging from 0 to M-1, respectively, and $c_0$ has the value of:

$$\sqrt{1/2}, \text{ if } p = 0; \text{ and}$$

$$1, \text{ if otherwise}$$

M vertical DCT coefficients are calculated by using the following equation:

$$c_{jh} = \frac{2}{M} \sum_{q=0}^{M-1} D_M(h, q) \cdot x_{jq} \quad \text{EQ. 2}$$

wherein $c_{jh}$ is an jth DCT coefficient for a jth column and $x_{jq}$ is a qth pixel value of the jth column.

For example, in FIG. 1B, the most right column is transformed using 3 point DCT based vectors. After performing the SA-DCT in a vertical direction, the lowest DCT coefficients (DC values) for the columns of the object region are found along the upper border of the 8×8 block as shown in FIG. 3C. To perform a horizontal DCT of the object region, each row of the object region is determined and the rows are shifted to the left border of the 8×8 block as shown in FIG. 1D. Horizontal SA-DCT adapted to the size of each row is then accomplished by using EQ. 1 and EQ. 2. The horizontal SA-DCT is performed along vertical SA-DCT coefficients with a same index(i.e., the DCT coefficients with a same h value for all columns in FIG. 1D are grouped together and are subjected to the horizontal SA-DCT). FIG. 1E shows the final location of resulting SA-DCT coefficients within the 8×8 block.

In this method, the final number of DCT coefficients is identical to the number of pixels contained in the object region. Also, the DCT coefficients are located in a similar manner as the standard 8×8 DCT. That is, the DC coefficient is located in the upper left corner of an 8×8 block. Depending on the actual shape of the object region, the remaining AC coefficients are concentrated around the DC coefficient.

The SA-DCT coefficients can be quantized and run-length coded with a standard hybrid coding scheme such as MPEG-1 before they are transmitted to a decoder. Contour parameters which can designate a shape of the object are transmitted to the decoder together with the DCT coefficients.

The decoder can perform an inverse operation of SA-DCT using a reverse operation of EQ. 1 and EQ. 2 in both vertical and horizontal directions.

However, in the conventional SA-DCT method described above, in case that there is a discontinuous row or column in the object region as shown in FIG. 1A, i.e., if there exist background pixels between object pixels on a same row or column, there may occur a low correlation between pixel values of the object pixels on the discontinuous row or column when each row or column is shifted and aligned along the left or the upper border and, thereafter, the characteristics of the SA-DCT may be worsened by high frequency components generated due to the low correlation between the object pixels.

SUMMARY OF THE INVENTION

It is, therefore, a primary object of the present invention to provide a method and apparatus capable of compensating discontinuities between object pixels located on a same row or column of an object region in an input video signal.

In accordance with the present invention, there is provided a method for padding an input video signal for shape adaptive discrete cosine transform, the input video signal being divided into a multiplicity of image blocks of an identical size of N×N pixels and each of the image blocks being segmented into an object and a background regions which include object pixels and background pixels, respectively, N being a positive integer, the method comprising the steps of: scanning an image block containing the object and the background pixels to thereby detect a padding pixel, the padding pixel representing a background pixel located between the object pixels on a same row or column in the image block; calculating a substitute pixel value based on the pixel values of the object pixels; and providing the substitute pixel value to the padding pixel to thereby produce a padded image block having a compensated object region, the compensated object region containing the object pixel values and the substitute pixel value.

In accordance with another aspect of the present invention, there is provided an apparatus for padding an input video signal for shape adaptive discrete cosine transform, the input video signal being divided into a multiplicity of image blocks of an identical size of N×N pixels and each of the image blocks being segmented into an object and a background regions which include object pixels and background pixels, respectively, N being a positive integer, which comprises: a detection block for finding a padding pixel by scanning an image block containing the object and the background pixels, the padding pixel representing a background pixel located between the object pixels on a same row or column in the image block; a calculation block for computing a substitute pixel value based on the pixel values of the object pixels; and a compensation circuit for providing the substitute pixel value to the padding pixel to thereby produce a padded image block having a compensated object region, the compensated object region containing the object pixel values and the substitute pixel value.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1A:
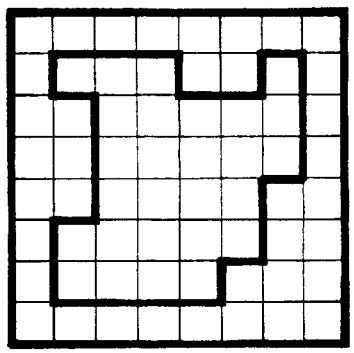
FIGS. 1A to 1E illustrate an exemplary process of SA-DCT of an image block.
Figure 1B:
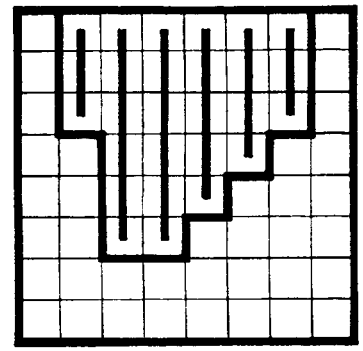
Figure 1C:
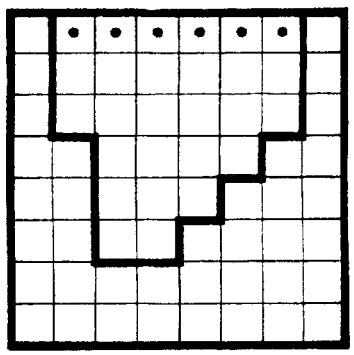
Figure 1D:
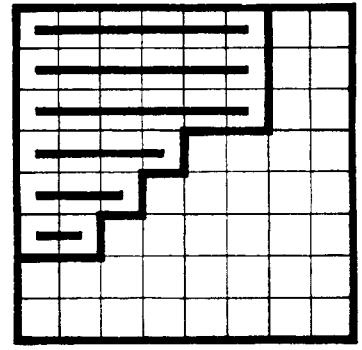
Figure 1E:
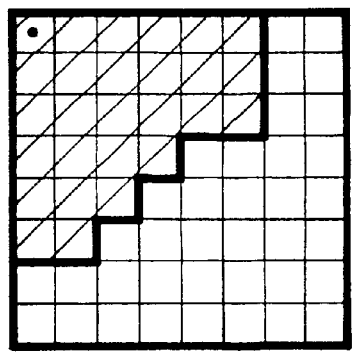
Figure 2:
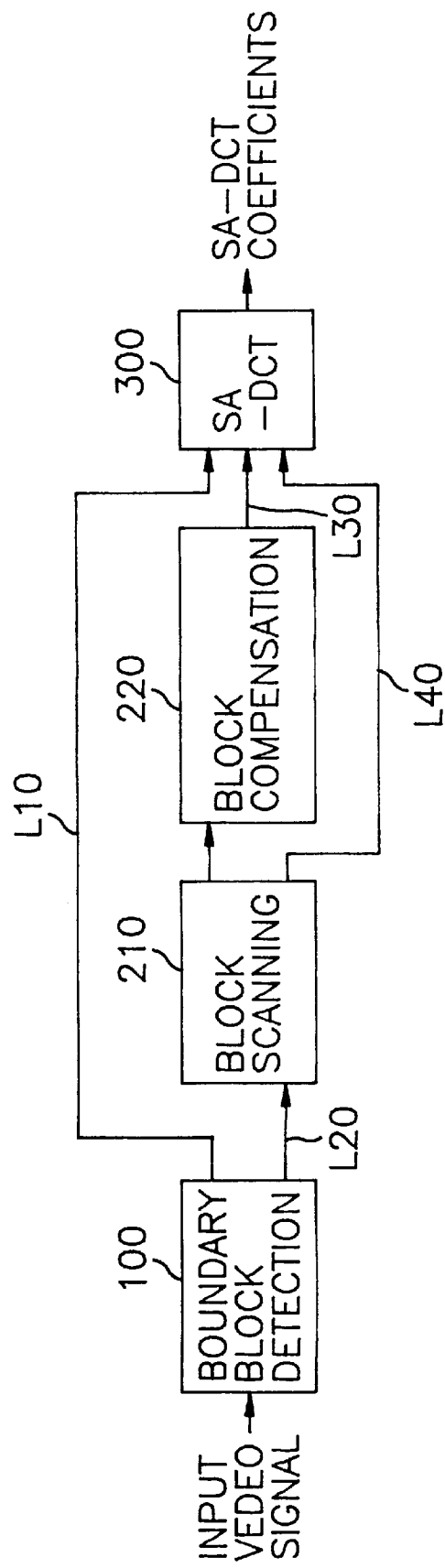
FIG. 2 presents a schematic block diagram of the inventive apparatus for performing the SA-DCT of the image block.

Referring to FIG. 2, an input video signal is coupled to a boundary block detection unit 100 on a block-by-block basis, the input video signal having arbitrary shaped objects and being divided into a multiplicity of image blocks, e.g., an image block of an identical size of N×N pixels being segmented into object and background regions with N being a positive integer. The object includes object pixels each of which has a value ranging from 1 to 255 and the background region contains background pixels each of which has a zero value. The boundary block detection unit 100 detects whether an image block included in the input video signal fed thereto is a boundary block or not, the boundary block containing both of object and background regions. If the image block is detected as a boundary block, the image block is provided to a block scanning unit 210 through a line L20 as a boundary block and, if otherwise, i.e., the image block includes only one of object and background regions, the image block is supplied to SA-DCT unit 300 via a line L10 as a smooth block.

The smooth block from the boundary block detection unit 100 is transformed to a set of SA-DCT coefficients at the SA-DCT unit 300 through the use of the conventional SA-DCT procedure before-mentioned as the prior art. Since the smooth block includes one of the object and background regions therein, the SA-DCT procedure of the smooth block is similar to a standard DCT.

On the other hand, the block scanning unit 210 scans the boundary block fed thereto through the line L20 in order to detect padding pixels, a padding pixel representing a background pixel located between object pixels on a same row or column of the object region in the boundary block.

Figure 3:
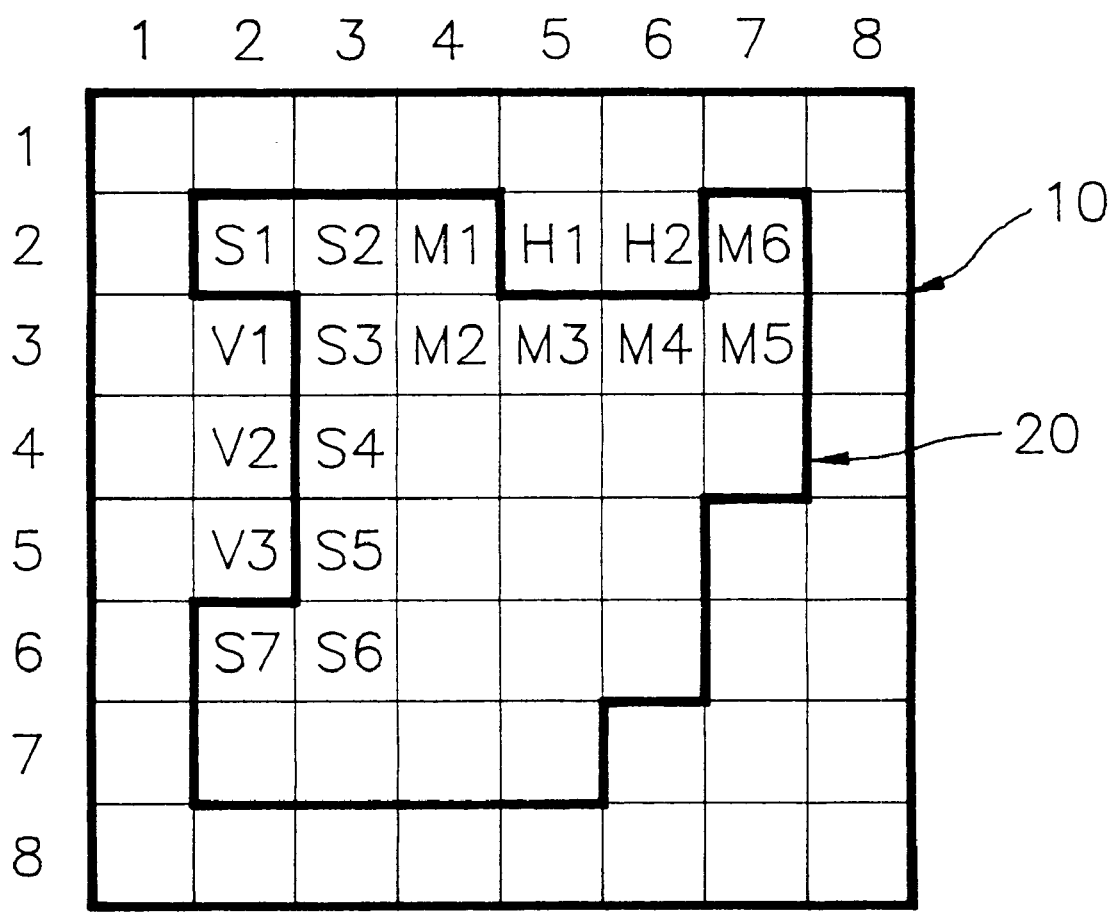
FIG. 3 describes an exemplary image block containing an object region with discontinuous row and column.

The block scanning unit 210 first horizontally scans each row of the object region in the boundary block so as to find a discontinuous row having at least one padding pixel. Then, the scanning unit 210 vertically scans each column of the object region to detect a discontinuous column. As shown in FIG. 3, if there exists a discontinuous row or column in the object region 20 of the boundary block 10, the boundary block and scanning information on the padding pixels therein are provided to a block compensation unit 220 and, if otherwise, the boundary block is coupled to the SA-DCT unit 300 via a line L40 and is transformed to a set of SA-DCT coefficients through the use of the conventional SA-DCT procedure.

If the boundary block and the scanning information are transferred from the block scanning unit 210, the block compensation unit 220 computes pixel values compensating the padding pixels based on object pixel values of the boundary block and the scanning information fed from the block scanning unit 210 to thereby produce a compensated boundary block.

With reference to FIG. 3, there exist two padding pixels H1 and H2 between the object pixels M1 and M6 on the upper first row and three padding pixels V1 to V3 between the object pixels S1 and S7 on the most left column in the boundary block 10. The block compensation unit 220 first assigns initial values to the padding pixels H1, H2 and V1 to V3. Herein, the initial values for the padding pixels H1 and H2 are determined by, e.g., averaging pixel values of neighboring pixels, e.g., pixels M1 to M6, surrounding the padding pixels H1 and H2 and, likewise, the initial values for the padding pixels V1 to V3 are obtained from pixel values of the pixels S1 to S7.

Then, based on the initial values of the padding pixels H1, H2 and V1 to V3 and the object pixel values of the boundary block 10, the block compensation unit 220 recursively executes the following equation for each of the padding pixels until a pixel value calculated with the following equation changes by an amount less than a predetermined value:

$$f^{(k+1)}(i, j) = \qquad \text{EQ. 3}$$

-continued $$\frac{1}{P}[f^k(i, j-1) + f^k(i-1, j) + f^k(i, j+1) + f^k(i+1, j)]$$

wherein $f^k(i,j)$ represents a kth iteration value of the padding pixel located at a pixel position (i,j) in the boundary block; P denotes the number of functions with pixel values which can be used in executing the right side of EQ. 3; i ranges from 1 to N; the 0th iteration value $f^0$ represents an original object pixel value or the initial value of each of the padding pixels; and only pixel values corresponding to the object pixels and the padding pixels are used in executing EQ. 3. In EQ. 3, the iteration values in the right side thereof are also calculated through the use of equations having the same pattern as that of EQ. 3.

In the above iteration process, if the iteration value of a padding pixel is fixed at a kth iteration procedure, the kth iteration value of the padding pixel is assigned to the padding pixel instead of the initial value thereof.

The compensated boundary block comprising the object pixels having the original object pixel values and the padding pixels compensated by the iteration procedure is provided to the SA-DCT unit 300 via a line L30 and is transformed to a set of SA-DCT coefficients through the use of the conventional SA-DCT procedure. At this time, the padding pixel values are also transformed to SA-DCT coefficients.

The SA-DCT coefficients of each image block in the input video signal produced by the SA-DCT procedure at the SA-DCT unit 300 can be quantized and run-length coded with a standard hybrid coding scheme such as MPEG-1 before they are transmitted to a decoder.

While the present invention has been described with respect to the particular embodiments, it will be apparent to those skilled in the art that various changes and modifications may be made without departing from the spirit and scope of the invention as defined in the following claims.

What is claimed is:

1. A method for padding an input video signal for shape adaptive discrete cosine transform, the input video signal being divided into a multiplicity of image blocks of an identical size of N×N pixels and each of the image blocks being segmented into an object and a background regions which include object pixels and background pixels, respectively, N being a positive integer, the method comprising the steps of:

(a) scanning an image block containing the object and the background pixels to thereby detect a padding pixel, the padding pixel representing a background pixel located among the object pixels on a same row or column in the image block;

(b) calculating a substitute pixel value based on the pixel values of the object pixels; and (c) providing the substitute pixel value to the padding pixel to thereby produce a padded image block having a compensated object region, the compensated object region containing the object pixel values and the substitute pixel value.

2. The method as recited in claim 1, wherein the step (a) includes the steps of:

(a1) horizontally scanning each row of the object region in the image block to thereby find the padding pixel; and (a2) vertically scanning each column of the object region in the image block to thereby detect the padding pixel.

3. The method as recited in claim 1, wherein, in the step (b), the substitute pixel value is determined by using a mean value of the pixel values of the object pixels surrounding the padding pixel.

4. The method as recited in claim 1, wherein the step (b) includes the steps of:

(b1) assigning an initial value to the padding pixel;

(b2) recursively executing EQ.A until an iteration value calculated with said EQ.A changes by an amount less than a predetermined value to thereby produce a fixed iteration value:

$$f^{(k+1)}(i, j) = \frac{1}{P}[f^k(i, j-1) + f^k(i-1, j) + f^k(i, j+1) + f^k(i+1, j)] \quad \text{EQ. A}$$

wherein $f^k(i,j)$ represents a kth iteration value of the padding pixel located at a pixel position (i,j) in the image block; P denotes the number of functions with pixel values which are used in executing the right side of said EQ.A; i ranges from 1 to N; the 0th iteration value $f^0$ represents an original object pixel value or the initial value of the padding pixel; and only pixel values corresponding to the object pixels and the padding pixel are used in executing said EQ.A; and (b3) determining the fixed iteration value corresponding to the padding pixel as the substitute pixel value.

5. The method as recited in claim 4, wherein the initial value of the padding pixel is a mean pixel value of the object pixels surrounding the padding pixel.

6. An apparatus for padding an input video signal for shape adaptive discrete cosine transform, the input video signal being divided into a multiplicity of image blocks of an identical size of N×N pixels and each of the image blocks being segmented into an object and a background regions which include object pixels and background pixels, respectively, N being a positive integer, which comprises:

a detection means for finding a padding pixel by scanning an image block containing the object and the background pixels, the padding pixel representing a background pixel located among the object pixels on a same row or column in the image block;

a calculation means for computing a substitute pixel value based on the pixel values of the object pixels; and a compensation means for providing the substitute pixel value to the padding pixel to thereby produce a padded image block having a compensated object region, the compensated object region containing the object pixel values and the substitute pixel value.

7. The apparatus according to claim 6, wherein the detection means includes:

means for horizontally scanning each row of the object region in the image block to thereby find the padding pixel; and means for vertically scanning each column of the object region in the image block to thereby detect the padding pixel.

8. The apparatus according to claim 6, wherein the calculation means determines the substitute pixel value by using a mean value of the pixel values of the object pixels surrounding the padding pixel.

9. The apparatus according to claim 6, wherein the calculation means assigns an initial value to the padding pixel and then computes the substitute pixel value through the use of a recursive iteration method based on the following equation:

$$f^{(k+1)}(i, j) = \qquad\qquad \text{EQ. B}$$
$$\frac{1}{P}[f^k(i, j-1) + f^k(i-1, j) + f^k(i, j+1) + f^k(i+1, j)]$$

wherein $f^k(i,j)$ represents a kth iteration value of the padding pixel located at a pixel position (i,j) in the image block; P denotes the number of functions with pixel values which are used in executing the right side of said EQ.B; i ranges from 1 to N; the 0th iteration value $f^0$ represents an original object pixel value or the initial value of the padding pixel; and only pixel values corresponding to the object pixels and the padding pixel are used in executing said EQ.B.

10. The apparatus according to claim 9, wherein said EQ.B is recursively executed for the padding pixel until the iteration value calculated with said EQ.B changes by an amount less than a predetermined value to thereby produce a fixed iteration value and the fixed iteration value corresponding to the padding pixel is determined as the substitute pixel value.

11. The apparatus according to claim 9, wherein the initial value of the padding pixel is a mean pixel value of the object pixels surrounding the padding pixel.

12. A method for padding an image block which has already been segmented into object regions and background regions, which include object pixels and background pixels, respectively, said method comprising the steps of:

locating at least one background pixel positioned between two object pixels;

calculating a substitute pixel value based on pixel values of at least one of said two object pixels; and assigning said substitute pixel value to said at least one background pixel.

13. The method of claim 12, wherein said step of calculating entails iteratively computing a substitute pixel value until a predetermined condition is met.

14. The method of claim 12, wherein only object pixels and background pixels positioned between two object pixels are used to calculate a substitute pixel value.

15. The method of claim 14, wherein said step of calculating entails iteratively computing a substitute pixel value until a predetermined condition is met.

16. The method of claim 15, wherein said step of locating includes the steps of:

scanning each row of the object region to locate at least one background pixel between two object pixels; and scanning each column of the object region to locate at least one background pixel between two object pixels.

17. The method of claim 12, wherein said step of locating includes the steps of:

scanning each row of the object region to locate at least one background pixel between two object pixels; and scanning each column of the object region to locate at least one background pixel between two object pixels.

* * * * *